Patented June 24, 1930

1,768,007

UNITED STATES PATENT OFFICE

FRED L. SIGMUND, OF MOORESTOWN, NEW JERSEY

CHEMICAL COMPOUND OR TABLET FOR PROLONGING BLOOM LIFE OF CUT FLOWERS

No Drawing.    Application filed March 7, 1930.   Serial No. 434,166.

This invention relates to a new and practical method and product adapted for prolonging the bloom life of cut flowers.

Various flowers when cut vary a great deal in remaining fresh, in other words some wither more quickly than others, even though they may be placed in fresh water (which is usually customary) in order to retain their freshness.

Therefore it is the purpose of the present invention to provide an improved chemical compound in a tablet form or otherwise, to be placed in the fresh water, which has been found to greatly increase the bloom life of cut flowers, and under suitable and proper conditions enable the flowers to likewise retain their perfume substantially as long as the life of the cut flower.

It is to be understood that the particulars herein given are in no way limitative, and that while still keeping within the scope of the invention, any desired modification of the portions of the ingredients may be made in the compound according to circumstances.

The invention comprises further features and combination of details to be hereinafter set forth, and claimed.

In making up this improved compound in tablet form or otherwise, one percent of phosphoric acid may be absorbed by a menstruum of milk sugar.

As just stated this compound is designed to be made into tablet form, though it may be made in a solution or otherwise, and such tablet is designed to contain five grains of the mixture as a suitable quantity to be used in one quart of water. The tablet is designed to be medium hard, so as to dissolve or disseminate or spread widely its qualities gradually.

The above named chemicals are harmless, and experiments show that a medium sized bunch of cut flowers, when placed in one quart of water, in which a tablet comprising the above chemicals is placed, the life and the perfume of the blooms will last for a substantial period.

An excess of water evaporation will take place if too many flowers are placed in the quantity of water herein specified. It matures to florescence, which fresh water will not alone do. This is especially noticeable in stalk bloomers, such as antirrhinums, delphiniums and gladiolus, and also matures the half grown but not opened lilies, and sometimes under suitable room conditions will enhance the perfume-giving qualities of open flowers.

The dissolving tablet with the liberation of phosphoric acid retards the formation of micro-organisms (which cause decomposition of the stems, and shortens the bloom life of the flower) therefore prolonging the bloom life of cut flowers.

This mixture of milk sugar and diluted phosphoric acid acts synergistically, that is one aids another, thus increasing the bloom life of cut flowers.

The effect of this mixture or compound is one of greater erectness of stems and the blooms and does noticeably prolong bloom life. The stems of cut flowers should be cut on an angle, so that when the stems are immersed in the water, in which one or two tablets of this mixture have been deposited, it will enable the stems to more readily absorb the rejuvenating qualities from the chemical mixture. By cutting the stems on an angle it is possible to expose a maximum portion of the sap ducts to the water and the chemical properties, and will at the same time permit the stems to be placed deeply in a container.

It is obvious that the stems should not be bruised or broken so that the medicinal invigorating properties will be drawn through the sap ducts of the stems.

Fresh air greatly enhances the keeping qualities of the flowers.

For some flowers an acid solution is more suitable, and for some others a sweeter solution or mixture is preferable. However the present chemical mixture in tablet form has been found to agree with nearly all varieties of flowers. As in this chemical content there is enough acid qualities to suit the need of nearly all flowers and also enough sweetness for other types. In this present form of tablet there is enough chemical content to suit cut flower needs in one quart of water.

The invention having been set forth, what is claimed is:

1. A chemical composition for the purpose set forth, consisting of one percent of phosphoric acid and a menstruum of milk sugar.

2. A five grain chemical tablet composition for the purpose set forth, consisting of phosphoric acid and milk sugar.

In testimony whereof he affixes his signature.

FRED L. SIGMUND